April 22, 1969 J. W. MERRICK 3,440,348

MULTIVIBRATOR CAPACITOR MICROPHONE CIRCUIT

Filed May 26, 1966

INVENTOR:

J. W. MERRICK

BY Theodore E. Bieber

HIS ATTORNEY

INVENTOR:
J. W. MERRICK
BY: Theodore E. Bieber
HIS ATTORNEY

United States Patent Office 3,440,348

Patented Apr. 22, 1969

3,440,348

MULTIVIBRATOR CAPACITOR MICROPHONE CIRCUIT

James W. Merrick, El Paso, Tex., assignor to Shell Oil Company, New York, N.Y., a corporation of Delaware Continuation-in-part of application Ser. No. 466,909, June 25, 1965. This application May 26, 1966, Ser. No. 553,156

Int. Cl. H04r 3/02; H04b 3/02; H03k 3/282

U.S. Cl. 179—1 9 Claims

ABSTRACT OF THE DISCLOSURE

A capacitor microphone circuit is utilized as part of the frequency determining cross-coupling network of an astable multivibrator. The square wave output from the multivibrator is passed through two parallel connected low-pass filters to a difference amplifier. The output voltage signal has an amplitude related to the acoustical signal of the capacitor microphone. A plurality of the multivibrators, including the capacitor microphones may be used in an array wherein only a single filter and amplifier circuit is required. The individual multivibrators are coupled to the filtering circuit through suitable resistances to balance the circuit.

This application is a continuation-in-part of the applicant's earlier filed copending application Ser. No. 466,909, filed June 25, 1965, now abandoned.

This invention pertains to microphones and, more particularly, to a multivibrator circuit for use with a capacitor type of microphone.

The capacitor type microphone, although well known, has been used basically in two types of systems. The first is an amplitude modulation type of system employing a vacuum tube having an open grid circuit. The second type of circuit is normally an oscillator circuit where the microphone is used to frequency modulate the oscillator signal. Both of these circuits are successful but have several drawbacks. For example, the amplitude modulated circuit has poor low frequency response as a result of the resistance leakage in the cathode circuits of the vacuum tube. When frequency modulation is used the frequency drift of the oscillator circuit causes poor response of the microphone to produce a signal.

The subject invention avoids the above difficulties of previous circuits employing capacitor type microphones by utilizing a cross-coupled free running astable multivibrator circuit. The capacitor microphone is substituted for one of the coupling capacitors of the circuit. The average output of the multivibrator circuit will be related to the following formula:

$$\frac{ERCm}{RCm+RC} \text{ or } \frac{ECm}{Cm+C}$$

wherein E equals the applied voltage, R is the coupling resistance, C is the coupling capacitor, and $Cm$ is the capacitance of the capacitor microphone. From an inspection of this relation it is seen that if the capacitance of the capacitor microphone is approximately equal to the coupling capacitor then the change in the average voltage output of the multivibrator for a small change in capacity of microphone would be approximately $$\frac{E}{2}\left(\frac{\Delta Cm}{Cm}\right)$$

From the above, it is seen that the square wave output from the multivibrator may be passed through a low pass filter to remove the square wave frequency and provide average output voltage equal to the input signal to the capacitor type microphone. Since the multivibrator frequency is removed from the output signal of the multivibrator, any change in the frequency of the multivibrator will have no effect on the response of the capacity microphone. Thus, the difficulty that arises in frequency modulation circuits has been eliminated. Similarly, any drift in the multivibrator circuit will not affect the output since it is the average voltage over several cycles of the multivibrator that is used as the useful output signal.

The above advantages of this invention and additional advantages will be more easily understood from the following detailed description of the preferred embodiment when taken with the attached drawings in which.

Figure 1:
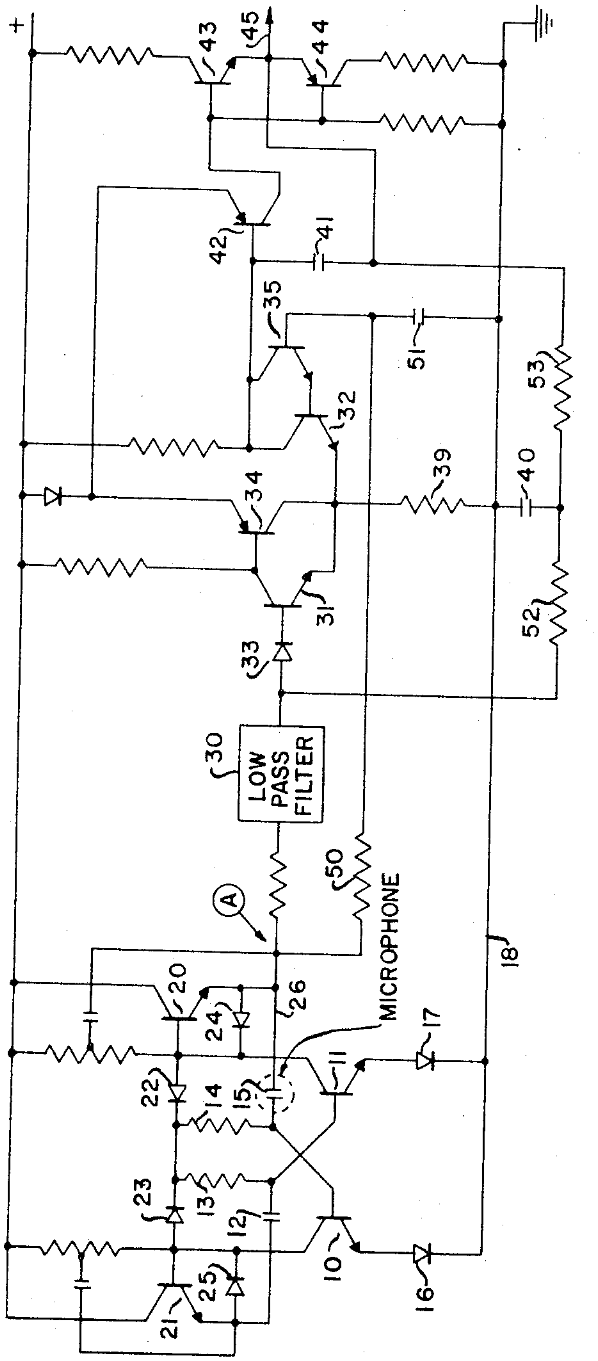
FIGURE 1 is a schematic drawing of the multivibrator circuit for use with a capacitance type microphone.

Referring now to FIGURE 1, there is shown a suitable circuit for use with a capacitor type microphone incorporating the features of this invention. More particularly, the transistors 10 and 11 form the free running astable multivibrator. The emitters of the two transistors are connected to ground 18 by connections that include diodes 16 and 17, respectively. The diodes 16 and 17 are used to prevent back biasing of the transistors and possible damage to them. The capacitor 12 and resistance 13 form one of the resistance capacitance coupling networks between the collector of the transistor 10 and the base of the transistor 11. Similarly, the resistance 14 and capacitance 15 form the RC coupling network between the collector of the transistor 11 and the base of the transistor 10. The capacitor 15 represents the capacitance microphone. The capacitor 12 should have a capacitance substantially equal to the capacitance of the microphone to provide substantially uniform pulses during normal operation of the multivibrator.

The transistors 20 and 21 are disposed in an emitter follower configuration and utilized to shape the square wave pulse output signals from the multivibrator. The transistors 20 and 21 are coupled in the base collector circuits of transistors 10 and 11 and thus reduced the switching time of the circuit. The reduction in switching time results in sharper output pulses from the multivibrator. The transistor 20 in addition speeds the response of the circuit by decreasing the large time constant required to charge the capacitor 40 as will be explained below. The diodes 24 and 25 are placed in the emitter circuits of transistors 20 and 21, respectively, to prevent the transistors from being back biased and possibly damaged. All of the transistors 10, 11, 20 and 21 are powered from the positive power supply through use of suitable dropping resistors.

The two diodes 22 and 23 disposed in a parallel arrangement with the capacitor 12 and capacitor microphone 15 are utilized to prevent the multivibrator from assuming a state in which both transistors 10 and 11 are conducting. In cases where both transistors 10 and 11 attempt to conduct there would be no forward biasing of either of the diodes 22 and 23; thus, both transistors would cease to conduct. As a result of the slight variations in characteristics of the two halves of the multivibrator circuit one half will then commence to conduct prior to the other half and drive the second half to a nonconductive condition. Thus, the two diodes 22 and 23 effectively prevent the multivibrator from being stuck in a nonoperating condition.

The output signal from the multivibrator is connected by means of a lead 26 to a low pass filter 30 disposed in a parallel with a filter circuit composed of a resistance 50 and a capacitor 51. The low pass filter 30 is designed to remove the frequency of the multivibrator and only pass the average voltage signal. The low pass filter 30 is coupled to the difference amplifier comprising the transistors 31 and 32. A diode 33 disposed in the connection between the low pass filter 30 and the transistor 31 to cancel out the emitter to base voltage of transistor 35 and thus balance the difference amplifier. In addition to the transistors 31 and 32 an additional stage of amplification for each half of the difference amplifier is supplied by means of the transistors 34 and 35.

The difference amplifier supplies an output signal which is related to the difference in voltage between the adjacent pulses of the multivibrator signal. The output signal from the difference amplifier is used to charge a capacitor 40 through a resistance 39. As is explained above, the use of the amplification stage 20 insures a relatively low output impedance for driving the low-pass filter 30. In addition, the output signal from the multivibrator is filtered by means of the resistance 50 and capacitor 51. The time constant of the filter circuit 50 and 51 should be chosen relatively long compared to the lowest frequency to be picked up by the microphone to provide drift correction for the difference amplifier. Normally, a time constant of 0.1 second would be sufficient for normal operation of the circuit.

The capacitors 40 and 41 and resistors 52 and 53 comprise negative feed-back networks to improve the stability of the difference amplifier circuit. The amplifying stage 42 amplifies the difference amplifier signal and supplies it to a push-pull amplifier formed by the transistor stages 43 and 44. The push-pull amplifier further amplifies the difference amplifier signal and supplies it as an output signal on the lead 45. Thus, the signal appearing at the lead 45 is a voltage signal whose amplitude is related to the acoustical input signal to the capacitor microphone 15.

Figure 2:
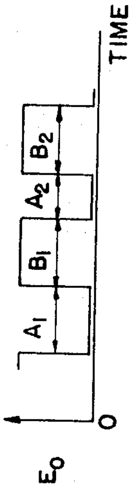
FIGURE 2 is a wave form showing the response of the multivibrator to an input to the capacitance microphone.

Referring now to FIGURE 2, the operation of the above-described circuit can be illustrated. As shown in FIGURE 2, A1 represents the signal that results at point A when the stage 11 conducts and stage 10 is not conducting, while B represents the signal when the stage 10 conducts and the stage 11 is not conducting. The overall time length of the signal B remains relatively constant but the length of A will vary in relation to the acoustical input signal to the capacitance microphone 15. Thus, the average voltage output signal of the multivibrator will be related to the acoustical input signal to the microphone. As shown in FIGURE 2, A1 and B1 are approximately equal in time while A2 is considerably smaller than B2, thus indicating an acoustical input signal through microphone 15. Likewise, for other acoustical input signals to the microphone 15 the pulse A can be larger than the pulse B. Thus, the average value of the voltage level of the multivibrator will be directly related to the acoustic input signal to the microphone 15.

Figure 3:
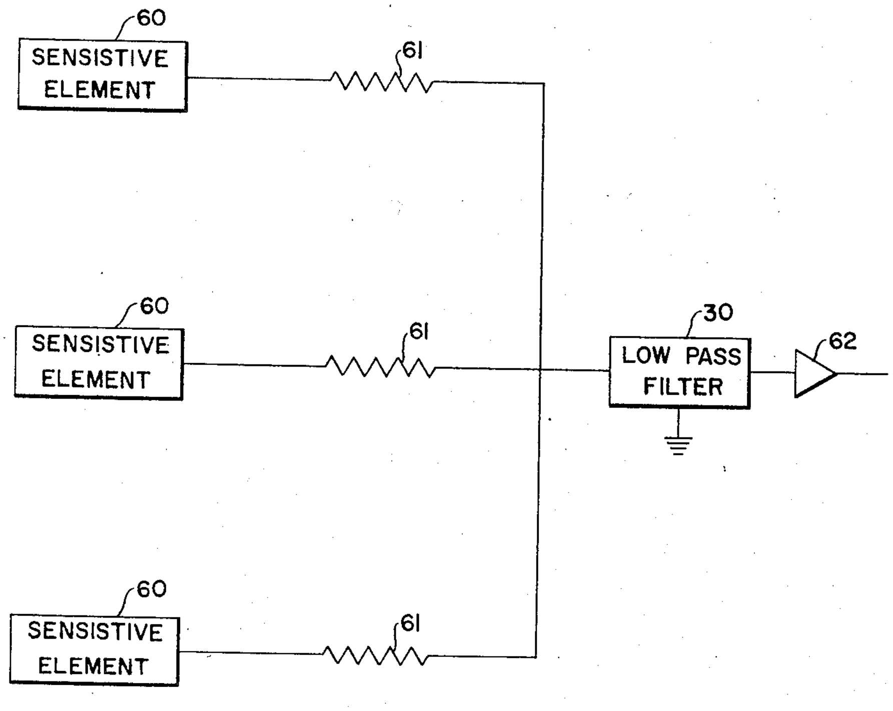
FIGURE 3 illustrates an array of sensitive elements, each consisting of the chopper portion of the capacitance microphone circuit with parallel outputs feeding into a single filter and amplifier.

FIGURE 3 illustrates an array of several microphones using a portion of the capacitance microphone circuit. This array increases the sensitivity without a proportional increase in the complexity of the system. Each of the sensitive elements or choppers 60 of FIGURE 3 consists of a capacitor microphone circuit as shown in FIGURE 1 including only the associated circuit to point A. A resistance 61 is placed in the output of each sensor with resistances coupled in parallel to the low pass filter 30. Each resistance 61 has a value equal to $\eta$R where R is the resistance of the low pass filter 30 and $\eta$ is the number of sensors in parallel. This insures that output of the low pass filter will have the same amplitude when $\eta$ sensors are used as if only a single sensor was used with a series resistance R and filter having a resistance R. The output of the low pass filter is coupled to an operational amplifier 62 to amplify the signal to the desired level.

This array microphone with its $\eta$ sensitive elements reduces the system noise by a factor $\sqrt{\eta}$. This reduction in noise occurs because the system noise is random and adds as $\sqrt{\eta}$ instead of adding in proportion to $\eta$ as is true with the signal. Along with the summation in the circuit there is a division by $\eta$. The net result is that the $\eta$ sensors turn out the same amplitude signal as a single sensitive element microphone but the system noise is reduced by the factor $\sqrt{\eta}$.

The sensitive elements of this array microphone may be spaced apart to obtain the signal-to-noise reduction of a large area microphone without having to fill in all of the area with a large area diaphragm.

In actual practice the complete circuit for one microphone may be used as shown in FIGURE 1 with the remaining sensitive elements being coupled to the low pass filter of the complete unit. Of course, the circuit of the complete unit must be modified to include a resistance 61 between the point A of FIGURE 1 and the low pass filter.

If it is desired to transmit the detected signal over a long distance, the combined outputs of the chopper units 60 may be transmitted without extracting the signal before transmitting. This permits the transmission of an alternating signal without the problem of preserving the high frequency content of the signal.

When the highest possible signal to noise ratio is desired from an array shown in FIGURE 3, the sensitivities of the individual units should be balanced. This can be done by varying the resistances 61 to compensate for slight differences between the individual microphones.

From the above description of the circuit of this invention and its operation, it is seen that the output signal is related to the input signal regardless of the frequency of the multivibrator. Also, there are no open grid circuits to cause poor frequency response. Thus, the invention effectively solves the problems that existed in prior art circuits using capacitor microphones.

I claim as my invention:

1. A capacitance microphone circuit comprising:
- an astable multivibrator having resistance and capacitance coupling between the stages;
- a capacitance microphone, said capacitance microphone being connected in the resistance capacitance coupling between the stages of one side of the multivibrator;
- a first low pass filter, said first filter having a pass band for excluding the frequency of the multivibrator, said multivibrator being coupled to said low pass filter, a difference amplifier, said low pass filter being coupled to the said difference amplifier whereby the amplitude of the output signal of the difference amplifier is related to the input signal to the microphone, and a second low pass filter, said second low pass filter being disposed in parallel with said first low pass filter and having a longer time constant than said first low pass filter.

2. The circuit of claim 1 and in addition a second filter circuit having a time constant equal to a few cycles of the lowest frequency to which the microphone is to respond, said second filter circuit being disposed in parallel with said low pass filter.

3. The capacitor microphone circuit of claim 1 and in addition a pulse-shaping means, said pulse-shaping means being disposed in circuit with said multivibrator.

4. The capacitor microphone of claim 3 wherein said pulse-shaping means comprises a pair of emitter followers, one emitter follower being disposed in each stage of said multivibrator.

5. An array of capacitor microphones comprising:
- a plurality of astable multivibrators, each of said multivibrators having a pair of stages with resistance and capacitance coupling between the output of one stage and input of the other, each of said multivibrators having a capacitance microphone disposed in the resistance capacitance coupling between the stages of one half of the multivibrator;

a plurality of resistors, one resistor being coupled in series with the output circuit of each multivibrator;

a low pass filter, all of said multivibrators being coupled in parallel to the input of said filter; and an operational amplifier, said filter being coupled to input of said operational amplifier.

6. The array of claim 5 in which the low pass filter and operational amplifier are located at a point remote from the multivibrators.

7. The array of claim 5 in which the resistance of each resistor is equal to $\eta$R where $\eta$ is the number of multivibrators in the array and R is the resistance of the low pass filter.

8. The array of claim 5 wherein the value of each resistance is varied to compensate for differences in the sensitivities of the multivibrator capacitor microphone combinations.

9. A system for reducing the noise in a microphone by a factor of $\eta$ where $\eta$ equals the number of sensitive elements disposed to detect an acoustic signal, said system comprising:

a plurality of sensitive elements, each element comprising an astable multivibrator having resistance and capacitance coupling between stages, said multivibrators having a capacitance microphone coupled in the resistance capacitance coupling between stages of one side of the multivibrator;

a low pass filter, all of said sensitive elements being coupled in parallel to the input of said filter; and an operational amplifier, said filter being coupled to the input of said amplifier.

References Cited

UNITED STATES PATENTS

| | | | |
|---|---|---|---|
| 1,717,630 | 6/1929 | Schäffer | 179—1 |
| 3,116,366 | 12/1963 | Seligson | 179—106 |
| 3,221,260 | 11/1965 | Henrion | 332—14 |
| 3,310,628 | 3/1967 | Cragg et al. | 179—1 |
| 2,438,950 | 4/1948 | Smith | 332—14 |
| 2,683,861 | 7/1954 | Vierling et al. | 179—106 |
| 3,061,800 | 10/1962 | Matzen | 332—14 |
| 3,129,391 | 4/1964 | Kabell | 332—14 |

KATHLEEN H. CLAFFY, *Primary Examiner.*

R. P. TAYLOR, *Assistant Examiner.*

U.S. Cl. X.R.

331—113